(12) United States Patent
Severson et al.

(10) Patent No.: US 12,503,385 B2
(45) Date of Patent: Dec. 23, 2025

(54) GLASS BLANK MOLD AND RELATED METHODS

(71) Applicant: Owens-Brockway Glass Container Inc., Perrysburg, OH (US)

(72) Inventors: Peter Severson, Monclova, OH (US); Daniel Newsom, Waterville, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 375 days.

(21) Appl. No.: 17/946,225

(22) Filed: Sep. 16, 2022

(65) Prior Publication Data

US 2024/0092674 A1    Mar. 21, 2024

(51) Int. Cl.
*C03B 9/38* (2006.01)

(52) U.S. Cl.
CPC .......... *C03B 9/3833* (2013.01); *C03B 9/3816* (2013.01); *C03B 9/3875* (2013.01)

(58) Field of Classification Search
CPC .................................................. C03B 9/3875
See application file for complete search history.

(56) References Cited

U.S. PATENT DOCUMENTS

| | | | |
|---|---|---|---|
| 4,251,253 A | 2/1981 | Becker et al. | |
| 4,502,879 A | 3/1985 | Foster | |
| 4,668,269 A * | 5/1987 | Cantu-Garcia | C03B 9/3875 65/83 |
| 6,412,308 B1 | 7/2002 | Lewis et al. | |
| 8,127,573 B2 | 3/2012 | Meyer et al. | |
| 9,145,322 B2 | 9/2015 | Pontes et al. | |
| 2007/0227192 A1* | 10/2007 | Meyer | C03B 9/3875 65/356 |
| 2014/0109619 A1* | 4/2014 | Pontes | C03B 9/3891 65/356 |

OTHER PUBLICATIONS

"Spot Drilling: The First Step to Precision Drilling", Aug. 25, 2022. [online] [retrieved Jan. 10, 2025]. <URL: https://www.harveyperformance.com/in-the-loupe/choosing-spot-drill/>. (Year: 2022).*

"Most accurate way to Spot/Drill a hole?", The Hobby-Machinist, May 15, 2018. [online] [retrieved Jan. 10, 2025]. <URL: https://www.hobby-machinist.com/threads/most-accurate-way-to-spot-drill-a-hole.69802/>. (Year: 2018).*

PCT Search Report and Written Opinion, Int. Application No. PCT/US2023/074061, Applicant: Owens-Brockway Glass Container Inc., Dated: Jan. 30, 2024.

* cited by examiner

*Primary Examiner* — Erin Snelting

(57) ABSTRACT

A glass container blank mold includes a mold portion having a neck end, an opposite baffle end, and a molding surface located between the ends that partly defines the shape of an exterior surface of a glass parison formed in the mold. Axial cooling channels formed within the mold portion extend axially alongside the molding surface and radially outboard of the molding surface. Heat block channel locators are formed on one of the ends of the mold portion. Each locator is visibly discernible from the end on which the locator is formed and radially inboard of the cooling channels. Each locator has a thermally insignificant depth and is located such that, when a heat block channel having a thermally significant depth is formed at the locator, heat transfer characteristics of the mold portion are altered between the molding surface and at least one of the cooling channels.

34 Claims, 5 Drawing Sheets

GLASS BLANK MOLD AND RELATED METHODS

This patent application discloses innovations related to glass container manufacturing and, more particularly, to making preforms for glass containers.

BACKGROUND

Machines for glass container manufacturing typically include a blank mold and a blow mold. The blank mold receives a charge of molten glass and shapes it into a glass blank, which may also be referred to as a glass preform or parison. The glass blank has a hollow interior with an open end where the neck of the finished container will be. The parison is transferred from the blank mold to a blow mold, where gas pressure is applied in the hollow portion of the parison to press the hot glass against interior surfaces of the mold to define the overall shape of the container. U.S. Pat. No. 9,950,942 illustrates examples of both a press-and-blow process, in which the hollow portion of the blank is formed by a plunger pressed into the center of the gob of molten glass, and a blow-and-blow process, in which the hollow portion of the blank is formed via gas pressure applied at the center of the gob of molten glass. In either case, the temperature profile along the interior surfaces of the blank mold affects the flow of molten glass in the mold cavity, the resulting temperature profile, and the glass thickness distribution along the glass blank when it reaches the blow mold.

SUMMARY OF THE DISCLOSURE

The present disclosure embodies a number of aspects that can be implemented separately from or in combination with each other.

A glass container blank mold in accordance with one aspect of the disclosure includes a mold portion, axial cooling channels, and heat block channel locators. The mold portion has a neck end, an opposite baffle end, and a molding surface located between the neck end and the baffle end. The molding surface partly defines the shape of an exterior surface of a glass parison formed in the mold. The axial cooling channels are formed within the mold portion and extend axially alongside and radially outboard of the molding surface. The heat block channel locators are formed on at least one of the ends of the mold portion. Each locator is visibly discernible from the end on which the locator is formed and located radially inboard of the cooling channels. Each locator has a thermally insignificant depth and is located such that, when a heat block channel having a thermally significant depth is formed at the locator, heat transfer characteristics of the mold portion are altered between the molding surface and at least one of the cooling channels.

In accordance with another aspect of the disclosure, there is provided a glass container blank mold including a mold portion, an axial cooling channel, a coolant deflector, and an axial access opening. The mold portion has a neck end, an opposite baffle end, and a molding surface located between the neck end and the baffle end. The molding surface partly defines the shape of an exterior surface of a glass parison to be formed by the mold. The axial cooling channel is formed within the mold portion and located between the ends of the mold portion radially outboard of the molding surface. The axial cooling channel has opposite inlet and outlet ends opening on an exterior surface of the mold portion. The coolant deflector is located at one of the ends of the mold portion and has a deflection surface facing the outlet end of the cooling channel. The axial access opening is formed through the coolant deflector and aligned with the cooling channel to provide access to the outlet end of the cooling channel through the deflector to alter coolant flow characteristics of the cooling channel.

In accordance with another aspect of the disclosure, there is provided a glass container blank mold including a mold portion and an axial cooling channel. The mold portion has a neck end, an opposite baffle end, and a molding surface. The molding surface is located between the neck end and the baffle end and partly defines the shape of an exterior surface of a glass parison to be formed by the mold. The axial cooling channel is formed within the mold portion and located between the ends of the mold portion radially outward of the molding surface. The axial cooling channel has opposite inlet and outlet ends opening on an exterior surface of the mold portion and a cross-sectional area at one of the ends that is greater than a cross-sectional area at another location along the cooling channel.

In accordance with another aspect of the disclosure, there is provided a method including: (a) forming a first parison in a glass blank mold, (b) forming a first glass container from the first parison in a glass blow mold, (c) altering thermal characteristics of the glass blank mold, (d) forming a second parison in the glass blank mold after step (c), and (e) forming a second glass container from the second parison in the glass blow mold. The glass blank mold has a molding surface, axial cooling channels radially outboard of the molding surface, and heat block channel locators on an axial end of the mold. Each locator is formed at a location radially inboard of the cooling channels. Step (c) includes forming a heat block channel at one of the locators to interfere with heat transfer through the blank mold.

In accordance with another aspect of the disclosure, there is provided a method including: (a) forming a first parison in a glass blank mold, (b) forming a first glass container from the parison in a glass blow mold, (c) altering thermal characteristics of the glass blank mold, (d) forming a second parison in the glass blank mold after step (c), and (e) forming a second glass container from the second parison in the glass blow mold. The glass blank mold has a molding surface, axial cooling channels arranged radially outboard of the molding surface, and axial access openings formed through a coolant deflector at an end of the glass blank mold. Each access opening is aligned with one of the cooling channels and opens on a deflection surface facing an outlet end of the aligned cooling channel. Step (c) includes accessing the outlet end of one of the cooling channels through one of the access openings to modify coolant flow characteristics of the cooling channel.

In accordance with another aspect of the disclosure, there is provided a method including: (a) receiving a first charge of molten glass into a glass blank mold, (b) forming a first parison in a glass blank mold from the first charge of molten glass, (c) forming a first glass container from the first parison in a glass blow mold, (d) altering thermal characteristics of the glass blank mold to change how heat is transferred from glass to the glass blank mold, (e) receiving a second charge of molten glass into the glass blank mold after step (d), (f) forming a second parison in the glass blank mold from the second charge of molten glass, and (g) forming a second glass container from the second parison in the glass blow mold. The second glass container has a different distribution of glass than the first glass container, and step (d) includes: forming a heat block channel at a heat block channel locator provided in an end of the glass blank mold in step (a) or altering coolant flow characteristics of an axial cooling channel by accessing the cooling channel through a coolant deflector.

Like numerals among the illustrated embodiments generally designate like or corresponding elements throughout the several views of the drawing figures. Accordingly, the descriptions of the embodiments are incorporated into one another, and description of subject matter common to the embodiments generally may not be repeated where already disclosed.

DETAILED DESCRIPTION

Described below is a glass container blank mold for use in a glass container manufacturing process. The blank mold is configured to simplify modifications to a cooling system of the mold by enabling the modifications to be performed on-site at the glass manufacturing facility in which the blank mold is used. Until now, blank mold cooling system modifications required shipment of the blank mold out of the glass container manufacturing facility to a different facility having precision machining equipment, such as the original mold fabricator, because the container manufacturing facility does not have the required precision equipment or skilled tradespeople on staff to make the desired modifications. This can cause serious delays when implementing new glass container blank molds in the container manufacturing facility, where tweaks to the cooling system of the blank mold may be required to achieve the desired flow and deformation characteristics of molten glass in the blank mold prior to blow molding the finished glass container. In some cases, the blank mold must be shipped back and forth between the container manufacturing facility and the mold fabricator multiple times before the thermal characteristics of the blank mold are sufficiently adjusted, further delaying production of a new container design.

The blank mold described herein employs pre-formed locating features as received from the mold fabricator. These features are included in a manner that permits modification of the cooling system and thermal characteristics of the blank mold with non-precision equipment, such as a drill press or handheld rotary tool, such that personnel of the glass container manufacturing facility can perform the modifications. This advancement reduces the time required for such mold modifications to only a few hours or less, compared to the several weeks or months typically required to package, ship, and wait in the queue at a precision machining facility before receiving the blank mold back at the container manufacturing facility for another iteration of mold trials and possibly more modifications. Moreover, the container manufacturing facility can now make more gradual changes to the cooling system of the blank mold since the time required is relatively negligible, leading to more precise tailoring of its thermal characteristics. A method of making and using the blank mold is also disclosed.

Figure 1:
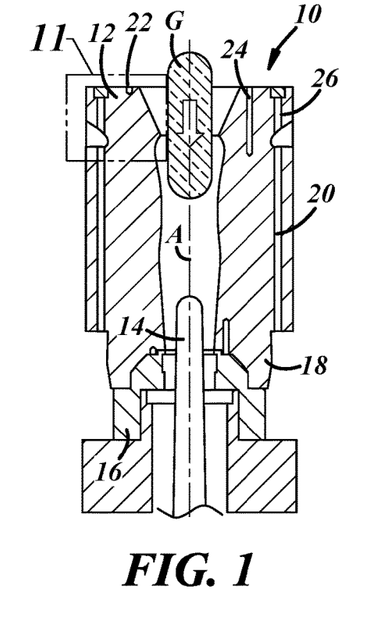
FIG. 1 is a cross-sectional view of a glass container blank mold in a closed condition receiving a charge of molten glass.

FIGS. 1-6 illustrate portions of an embodiment of a glass container molding process employing an illustrative glass container blank mold 10. FIGS. 1-6 illustrate a press-and-blow process, but the teachings disclosed herein are equally applicable to blow-and-blow processes. FIG. 1 is a schematic cross-sectional view of the blank mold 10 in a closed condition receiving a charge of molten glass G from a baffle end 12 of the blank mold. In this example, the end of a plunger 14 extends through a neck ring 16 and into the blank mold 10 from a neck end 18 of the mold. The mold 10 also includes axial cooling channels 20, heat block channel locators 22, heat block channels 24, and axial access openings 26.

Figure 2:
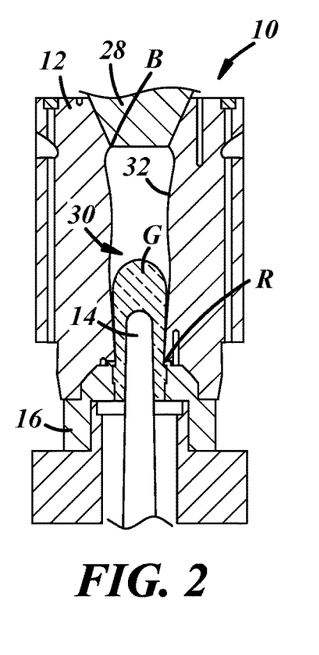
FIG. 2 is a cross-sectional view of the glass container blank mold of FIG. 1 after receiving the charge of molten glass and with a baffle end of the mold closed to define a mold cavity.

FIG. 2 illustrates a portion of a baffle 28 closing off the baffle end 12 of the mold 10. A blank mold cavity 30 is defined by the neck ring 16, the baffle 28, and a molding surface 32 of the mold 10 extending therebetween. A baffle parting line B is defined at a boundary of the mold cavity 30 where the baffle meets the blank mold 10, and a neck ring parting line R is defined at a boundary of the mold cavity where the neck ring 16 meets the blank mold. Each of the baffle parting line and neck ring parting line circumscribe a central axis A of the mold. The charge of glass G is at the neck end 18 of the mold 10 in FIG. 2, having flowed into a portion of the neck ring 16 and around the end of the plunger 14.

Figure 3:
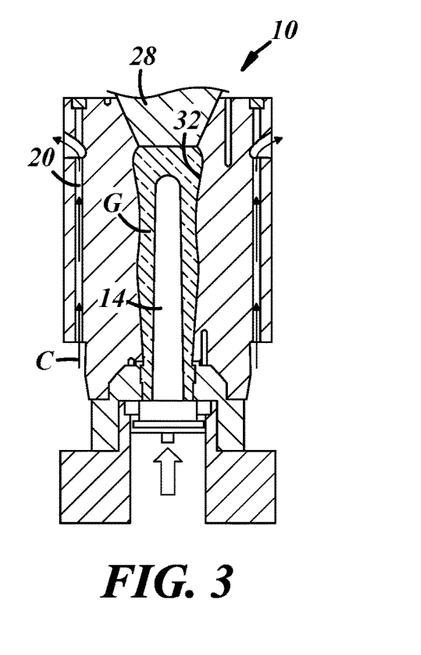
FIG. 3 is a cross-sectional view of the glass container blank mold of FIG. 2 after a plunger is moved into the mold cavity to press the glass against a molding surface.
Figure 4:
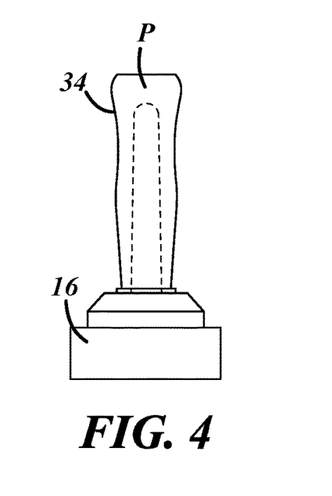
FIG. 4 is a side view of a parison formed in the glass container blank mold of FIGS. 1-3 supported by a neck ring.

FIG. 3 illustrates the blank mold 10 after the plunger 14 is moved axially into the mold cavity 30 to press the glass G against the molding surface 32 of the mold 10 to define the shape of an exterior surface 34 of a parison P (FIG. 4). Contact with the cooler blank mold 10 causes the molten glass G to begin to cool in the steps of FIGS. 2 and 3 via extraction of thermal energy from the glass by the bulk material of the mold. A coolant source (not illustrated) provides a flow of coolant C (e.g., air) through the mold 10 via the axial cooling channels 20 to continuously cool the mold 10. While the flow of coolant C is depicted only in FIG. 3, it may be present during the steps of FIGS. 1 and 2 and/or may be intermittent or continuous during and between molding cycles.

The plunger 14 is then retracted from the formed glass G, the baffle 28 is moved away from the mold 10, and the blank mold is changed from the closed condition of FIG. 3 to an open condition. The neck ring 16 remains in a closed condition and supports the formed parison P of FIG. 4 at its open end. At this stage of the process, the glass G is sufficiently cool to generally maintain the shape of the parison P for movement to a subsequent blow molding step and is also sufficiently hot to be blow molded to the shape of the finished glass container.

Figure 5:
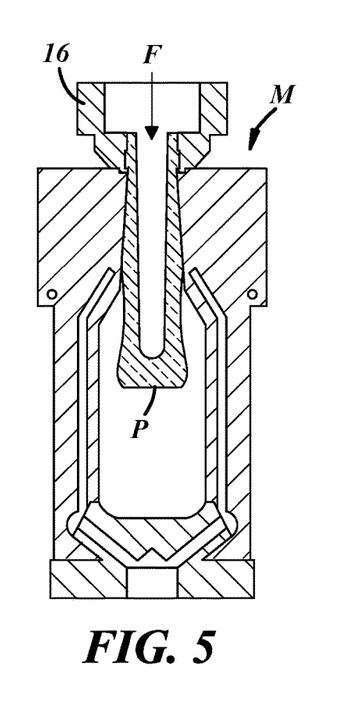
FIG. 5 is a cross-sectional view of the parison of FIG. 4 after being inverted and disposed in a cavity of a glass container blow mold.
Figure 6:
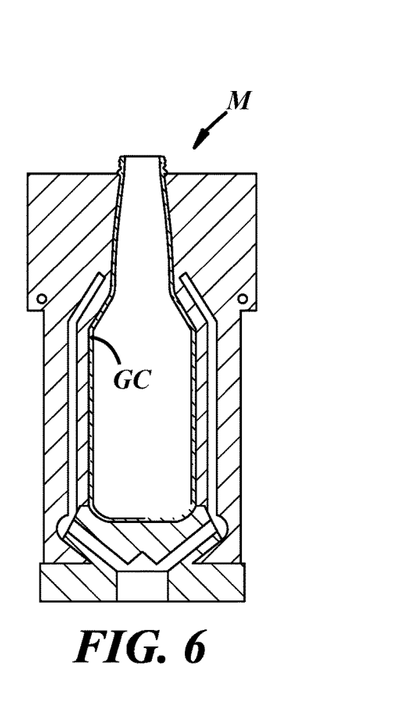
FIG. 6 is a cross-sectional view of the blow mold of FIG. 5 after the parison is formed into a glass container and the neck ring is removed.

FIG. 5 illustrates the parison P after inversion of the neck ring 16 and after being disposed between portions of an open glass container blow mold M, which is illustrated in a closed condition in FIG. 5. Fluid pressure F is then applied at the open end of the parison P to stretch and press the viscous glass against a molding surface of the blow mold M, where the glass is cooled to form the final shape of a glass container GC illustrated in FIG. 6. The neck ring 16 is changed to an open condition to release the glass container GC, inverted, and changed back to the closed condition to return to the neck end 18 of the blank mold 10 for another molding cycle.

Figure 7:
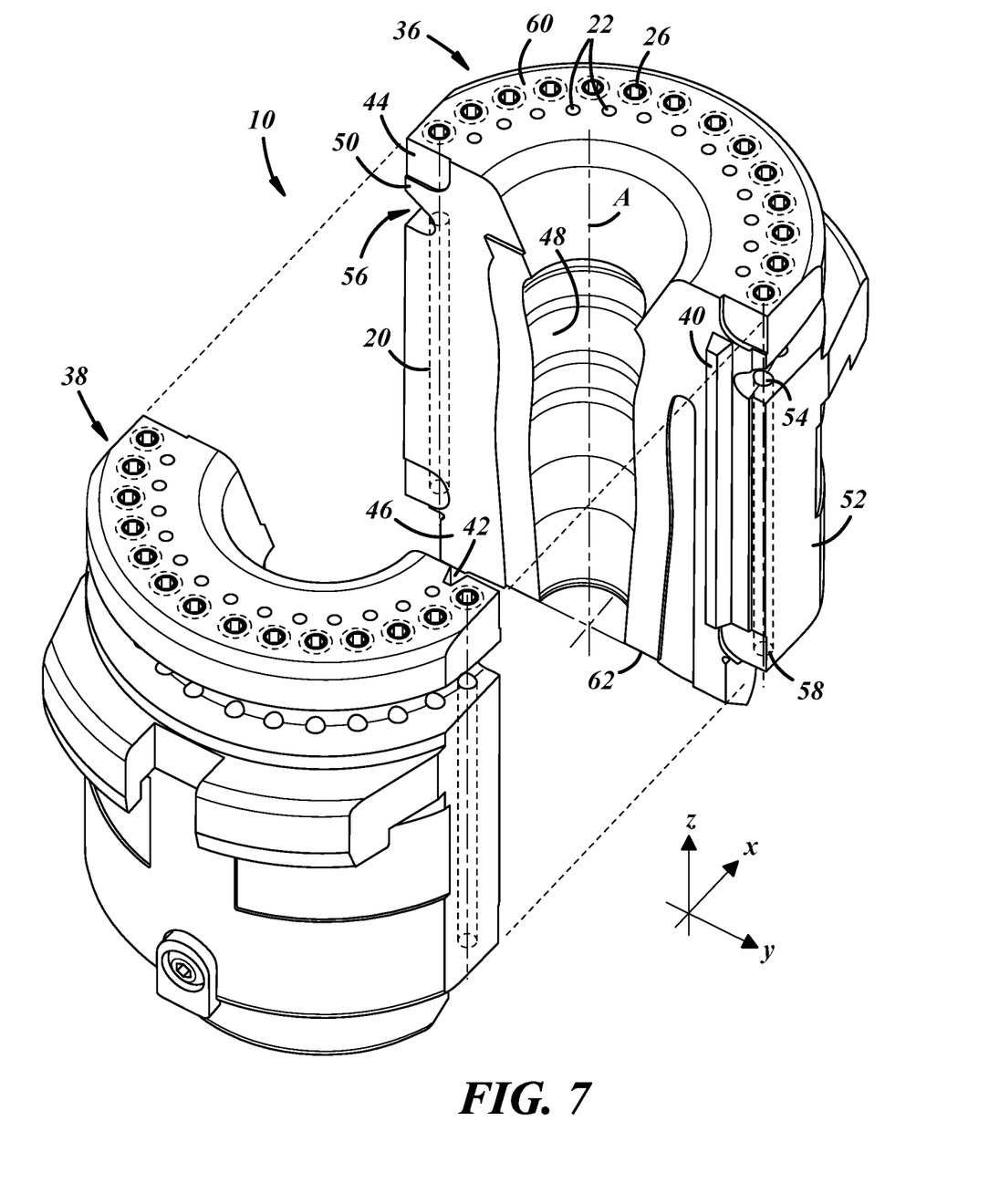
FIG. 7 is an isometric view of a glass blank mold in an open condition.

FIG. 7 is an isometric view of a more detailed example of the glass container blank mold 10. The blank mold 10 is illustrated in an open condition and includes opposite first and second mold portions 36, 38 configured to define a portion of the mold cavity 30 when the mold portions are moved toward each other in a transverse direction (x) to the closed condition, where they share a central axis A that extends in a vertical direction (z) in this example. The illustrated first mold portion 36 is a tongue half of the mold and includes a protrusion 40 that is received by a corresponding recess 42 of the second mold portion 38 (i.e., a groove half of the mold) when in the closed condition. Common features of the mold portions 36, 38 may be labeled in the drawings with reference numerals on only one of the mold portions for the sake of simplicity.

Each blank mold portion 36, 38 has a baffle end 44, a neck end 46, and a molding surface 48 located between the neck and baffle ends. The baffle end 44 of the first mold portion 36 is visible in the top end view of FIG. 8, and the neck end 46 of the first mold portion is visible in the bottom view of FIG. 9. The ends 44, 46 of each mold portion 36, 38 together define the respective baffle and neck ends 12, 18 of the blank mold 10, and the molding surfaces 48 of each mold portion 36, 38 together form the molding surface 32 of the blank mold. Each molding surface 48 thus partly defines the shape of the exterior surface 34 of the glass parison P formed in the blank mold 10. Each mold portion 36, 38 also includes a coolant deflector 50 (or wind bell) at the baffle end 44 that forms part of the coolant deflector of the mold 10. Each mold portion 36, 38 may also include one or more axial cooling channels 20, heat block channel locators 22, heat block channels 24, and/or axial access openings 26.

Each axial cooling channel 20 is formed within or at least partially through one of the mold portions 36, 38 and extends axially alongside the molding surface 48 at a location radially outboard of the molding surface. A radial direction is any direction in an x-y plane of FIGS. 7-9 that intersects the central axis A. As used herein, "outboard" is a relative term meaning farther away from the axis A, and "inboard" is a relative term meaning closer to the axis A. In the illustrated example, each mold portion 36, 38 includes a plurality of axial cooling channels 20 arranged in a circumferential array—i.e., each cooling channel 20 of the array is equidistant from the central axis A. Each axial cooling channel 20 opens on an exterior surface 52 of the mold portion. In this case, outlet ends 54 of the cooling channels 20 open on the exterior surface 52 of each mold portion along an annular recess 56 that delimits the coolant deflector 50 from the remainder of the mold portion. Inlet ends 58 of the cooling channels 20 open on an oppositely facing portion of the exterior surface of the mold portion 36 visible in FIG. 9.

Figure 8:
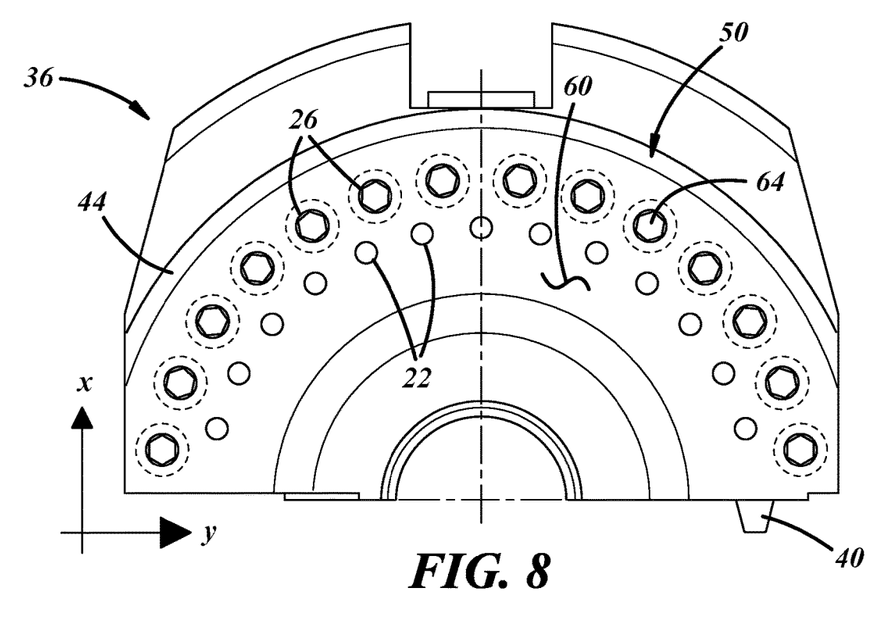
FIG. 8 is a view of a baffle end of a mold portion of the blank mold of FIG. 7.
Figure 9:
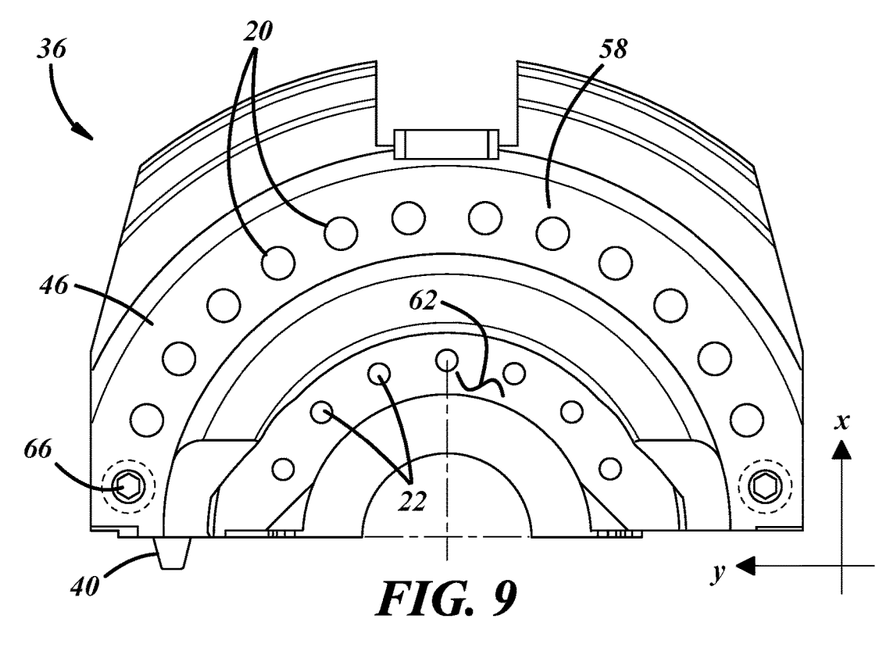
FIG. 9 is a view of a neck end of the mold portion of FIG. 8.

Each heat block channel locator 22 is formed on one of the ends 44, 46 of one of the mold portions 36, 38. Each locator 22 is radially inboard of each axial cooling channel 20 and radially outboard of at least a portion of the molding surface 48. In this example, each mold portion 36, 38 includes a plurality of heat block channel locators 22 arranged in circumferential arrays on opposite axial end surfaces 60, 62 of the mold portion. As shown in FIGS. 8 and 9, the array of locators 22 on the baffle end (FIG. 8) has a larger diameter than the array of locators on the neck end (FIG. 9). The location of each heat block channel locator 22 is a pre-determined location for a heat block channel 24 that can be formed at the respective locator 22 if necessary to alter thermal characteristics of the mold. Each heat block channel locator 22 is visibly discernible by an observer viewing the end of the mold portion 36, 38 in which the locator is formed.

Each axial access opening 26 is formed through the coolant deflector 50 of one of the mold portions 36, 38. While the coolant deflector 50 is at the baffle end 44 in this example, it is conceivable that the deflector could be at the neck end 46 or elsewhere between the ends of each mold section. Each access opening 26 is coaxial or otherwise aligned with a corresponding one of the axial coolant channels 20. In the illustrated example, each mold portion 36, 38 includes a plurality of access openings 26 arranged in a circumferential array that is in registration with the array of cooling channels 20. One end of each access opening 26 opens on the axial end surface 60 at the baffle end 44, and an opposite end of each access opening opens along the annular recess 56 facing the outlet end 54 of the corresponding cooling channel 20. The dashed lines surrounding the access openings 26 in FIG. 8 are schematic representations of internal threads that may be provided to receive an externally threaded plug 64 or other removable insert to close off the access openings until they are necessary to access the corresponding cooling channel as described further below.

In the illustrated example, thirteen heat block channel locators 22 are formed on the baffle end 44 of each mold portion with uniform angular spacing between adjacent locators of the array, as illustrated in FIG. 8. Fourteen axial access openings 26 are formed through the coolant deflector of each mold portion with uniform angular spacing between adjacent access openings in each quadrant of the circumferential array. Fourteen axial cooling channels 20 are in registration with the access openings 26. Each heat block channel locator 22 is located angularly between a respective pair of adjacent cooling channels 20 and access openings 26. As illustrated in FIG. 9, a smaller number of heat block channel locators 22 is formed in the neck end 46 of each mold portion with one locator for every two cooling channels 20 in this particular example. The array of locators 22 has uniform angular spacing between adjacent locators. In the illustrated example, two of the axial cooling channels 20 nearest the axial parting line of the mold are closed off by a threaded plug 66 or other removable insert at the neck end 46 (FIG. 9).

The difference between a heat block channel locator 22 and a heat block channel 24 is the depth of the feature. More particularly, a heat block channel locator 22 has a thermally insignificant depth, while a heat block channel 24 has a thermally significant depth. Whether the depth of the feature is thermally significant depends on its effect on the thermal characteristics of the mold or the mold section in which it is formed. In the illustrated example, each locator 22 and each heat block channel 24 is a blind hole. With reference to the cross-sectional view of FIG. 10, the depth of any one of the holes 22, 24 is thermally significant if it intersects a plane extending through the baffle parting line B or the neck ring parting line R. Where the parting line lies in a radial (x-y) plane as in the illustrated embodiment, the depth is thermally significant if it extends axially beyond the location of the baffle parting line B or the neck ring parting line R.

Figure 10:
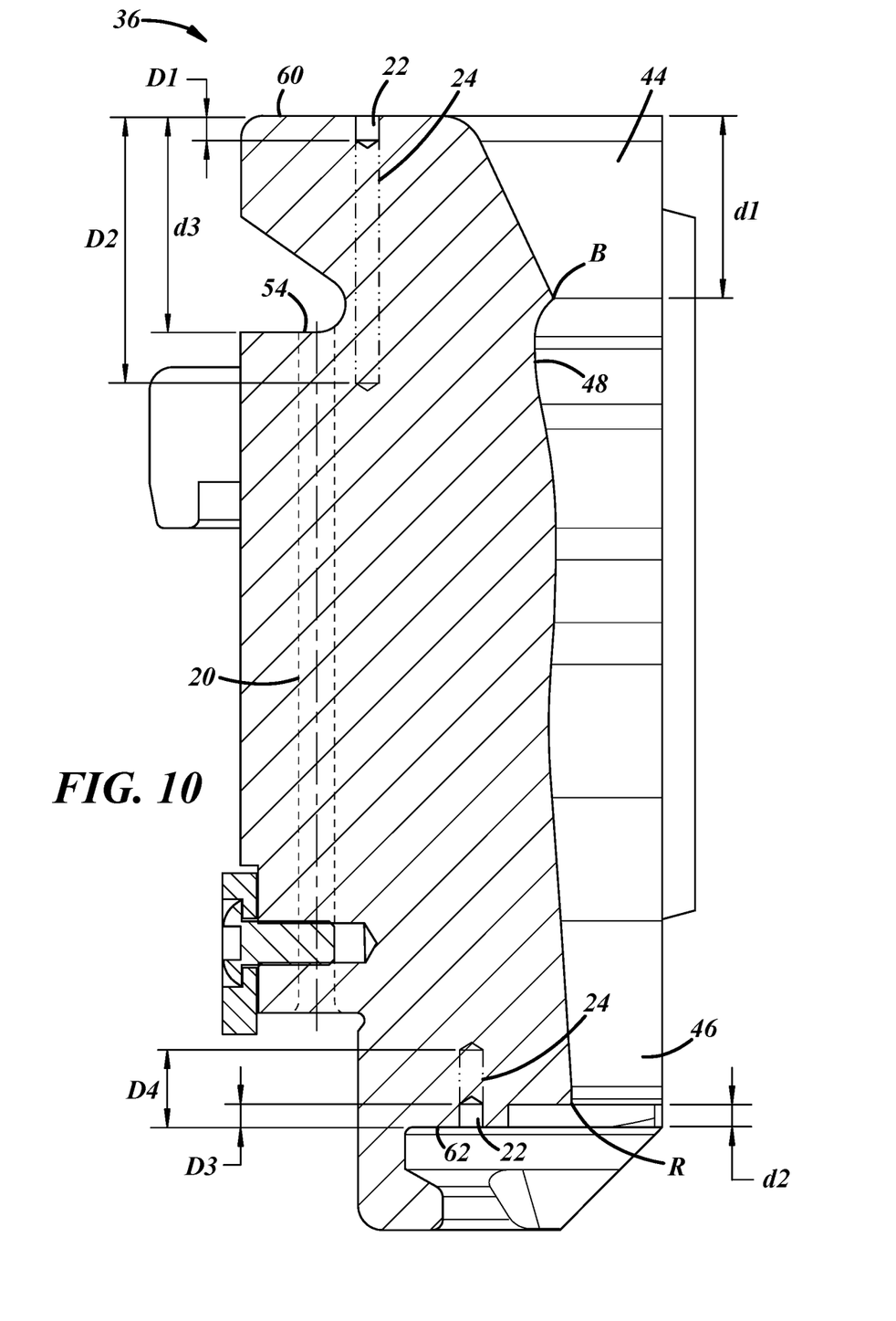
FIG. 10 is a cross-sectional view of the mold portion of FIGS. 8 and 9.

In FIG. 10, a heat block channel locator 22 is formed in the axial end surface 60 at the baffle end 44 of the mold portion to a depth D1. The depth D1 is considered thermally insignificant because it is less than or equal to an axial distance d1 between the axial end surface 60 in which the hole is formed and the location of the baffle parting line B. When it is desired to alter the thermal characteristics of the blank mold at the baffle end 44, the blind hole may be drilled to a thermally significant depth D2 to convert the heat block channel locator 22 to a heat block channel 24 (illustrated in phantom in FIG. 10). The depth D2 is considered thermally significant because it is greater than the axial distance d1 between the axial end surface 60 and the location of the baffle parting line B. Likewise, when it is desired to alter the thermal characteristics of the blank mold at the neck end 46 of the blank mold, a heat block channel locator 22 formed in the axial end surface 62 at the neck end of the mold portion to a thermally insignificant depth D3 may be converted to a heat block channel 24 (illustrated in phantom in FIG. 10) by drilling to a thermally significant depth D4. The depth D4 is considered thermally significant because it is greater than an axial distance d2 between the axial end surface 62 in which the hole is formed and the location of the ring parting line R.

Formation of each heat block channel 24 alters the thermal characteristics of the mold portion in which it is formed by replacing thermally conductive metal (e.g., tool steel) between the molding surface 48 and the axial cooling channels 20 with a void volume (e.g., air) such that less thermal energy is extracted from the molding surface 48 and, thereby, from the molten glass in contact with the molding surface during parison formation. Stated differently, the heat block channels 24 operate to locally block thermal heat transfer between the molding surface 48 and one or more of the cooling channels 20. Similarly, changing the depth and/or cross-sectional area of an already existing heat block channel 24 alters the thermal characteristics of the mold portion in which it is formed. For instance, deepening an existing heat block channel 24 may increase the amount of the molding surface 48 for which the channel 24 is thermally significant. Increasing the diameter of an existing heat block channel 24 may increase its thermal significance by further reducing heat transfer through the mold portion at the same local region it was already affecting. At least partially filling an existing heat block channel 24 with a thermally conductive material (e.g., weld filler) may decrease or eliminate its thermal significance by locally increasing heat transfer through the mold portion.

In the illustrated example, the depth D1, D3 of each locator 22 is equal to its diameter. Each locator 22 may for example be formed to a depth equal to the diameter of the cutting tool used to form it (e.g., ⅛"), so long as the diameter of the cutting tool is not greater than the respective distance d1, d2 from the axial end surface 60, 62 to the parting line B, R. In some embodiments, the depth of each locator 22 is no greater than is required to locate a similarly sized drill bit. For example, each locator 22 may be formed to a depth less than or equal to the axial length of the conical portion at the working end of a drill bit.

In some embodiments, there is an axial overlap between the heat block channel 24 and at least one axial cooling channel 20. In the example of FIG. 10, the heat block channel 24 to be formed in the baffle end 44 has a depth D2 that is greater than a distance d3 between the axial end surface 60 and the outlet end 54 of the depicted cooling channel 20 to provide the axial overlap such that a radial (x-y) plane intersects the cooling channel and the heat block channel.

In some embodiments, the depth D1 of each locator 22 is zero or essentially zero. For example, each locator 22 may be a visibly discernable laser marking or shallow dimple indicating the predetermined location for later forming a heat block channel at the glass container manufacturing facility.

The heat block channel locators 22 may be formed on the mold 10 by precision machining equipment at a different facility than the glass container manufacturing facility, such as at a mold fabrication facility where the mold 10 is fabricated before being sent to the container manufacturing facility for use in the glass container manufacturing process. The precision machining facility has the precision machining equipment and skilled tradespeople better suited for providing appropriately placed locators 22. For example, the mold fabricator is typically equipped with numerically controlled automated machining centers (CNCs) or EDM machining centers that work from programmed machine tool paths based on 3D CAD data of the mold to be made. A workpiece can be clamped to a CNC fixture, and machine tool paths can be followed relative to a fixed datum, making it relatively simple to form the circumferential arrays of locators 22 on the mold 10 during mold fabrication.

The glass container manufacturing facility, on the other hand, is in the business of making glass containers and does not typically have such precision machining equipment or personnel. These facilities may have a rudimentary tool shop including simpler and less precise tools such as drill presses, die grinders, band saws, etc. for minor jobs around the facility. But setting up a mold or mold portion to form heat block channels 24 in one of its ends at well-defined radial and angular locations is not possible with such tools in the absence of the above-described locators 22. For instance, when the mold 10 of the illustrated example is viewed from either the baffle end 12 or the neck end 18, there is no way to discern the radial extent of the molding surface 32 at any given axial location. Even if there was, workers at the glass container manufacturing facility may not have the engineering skill necessary to determine the optimum locations for the heat block channels 24. Further, the radial and angular location of each axial cooling channel 20 cannot normally be determined from the baffle end 12 of the mold because there are no concentric axial access openings 26 in a conventional blank mold.

The heat block channel locators 22 solve this and other problems by providing the mold 10 with visibly discernible features at which glass container manufacturing personnel can safely and effectively form heat block channels 24 with simple tools without having to ship the mold back to the mold fabricator or other precision machining facility to do the work. A rotary cutter such as a drill bit can be fitted to a non-programmable machine (e.g., a drill) to form the heat block channels 24 at pre-determined locations, potentially cutting days, weeks, or months from the time normally required to tune the cooling system of the mold.

A method may thus be described that includes the steps of forming a first glass container in a process including use of the above-described glass blank mold 10 and blow mold M, altering thermal characteristics of the blank mold, and then forming a second glass container using the altered blank mold and the blow mold. The second glass container may have physical characteristics different from that of the first glass container with the only process change being the altered thermal characteristics of the blank mold 10.

In one illustrative example, the first glass container has a first glass distribution in which a portion of the container is not formed to the desired glass wall thickness in the blow mold M, possibly because the corresponding portion of the glass parison P from the blank mold was too cool when introduced to the blow mold, leading to a failure to achieve adequate blow mold surface coverage with the glass when the parison was pressurized in the blow mold. Thermal characteristics of the blank mold 10 are then altered by forming a heat block channel 24 at one or more heat block channel locators 22 of the mold 10 at a location or locations corresponding to the defective area of the first glass container. In the case where the defect is near the bottom of the container, the heat block channel(s) 24 could be formed on the baffle end 12 of the blank mold, which would locally alter the thermal characteristics of the blank mold between the molding surface 32 and one or more of the cooling channels 20 in a manner that causes a portion of the molding surface to run hotter when forming a second parison than the same portion of the molding surface ran when forming the first parison. Consequently, the blow molding step in which the second glass container is formed may result in a different glass distribution than that of the first glass container, possibly eliminating the defect of the first glass container.

This is only one example of a defect that can be cured via formation of heat block channels. Other defects such as improper glass thickness, out-of-specification dimensions, optical defects from stretching the glass at an improper temperature in the blow molding step, or non-uniform glass distribution in the glass container can be addressed by altering thermal characteristics of the glass blank mold via formation of heat block channels 24 at predetermined locations. While this may have always been possible by sending the glass blank mold out to a precision machining facility, it is now possible to tune the cooling system of the blank mold on-site at the glass container manufacturer by virtue of the presence of the heat block channel locators.

In one embodiment, the method includes forming a first parison in a glass blank mold, forming a first glass container from the first parison in a glass blow mold, altering thermal characteristics of the glass blank mold, subsequently forming a second parison in the glass blank mold, and forming a second glass container from the second parison in the glass blow mold. The glass container blank mold has a molding surface, axial cooling channels radially outboard of the molding surface, and heat block channel locators on an axial end of the mold, with each locator being formed at radially between the molding surface and the cooling channels.

Alteration of the thermal characteristics of the blank mold 10 may include contacting the blank mold with a rotary cutting tool at one of the heat block channel locators 22 and drilling to a thermally significant depth to form a heat block channel 24. In some embodiments, the alteration includes manually aligning the cutting tool with one of the locators 22 and drilling to a thermally significant depth to form a heat block channel. In some embodiments, the alteration is performed using a non-programmable machine equipped with the rotary cutting tool.

To facilitate formation of heat block channels 24 at the glass container manufacturing facility, each heat block channel locator 22 may be a blind pilot hole formed in the mold 10 at the mold fabricating facility. Each locator 22 may be formed to a depth equal to or greater than an axial length of a conical tip of a drill bit used to form the pilot hole. In this manner, the rotary cutting tool used at the glass container manufacturing facility may be self-centering or at least easy to manually align with the locator 22. Each locator 22 may have a maximum depth equal to or less than a diameter of the heat block channel 24 formed at the locator.

Figures 11, 12, 13:
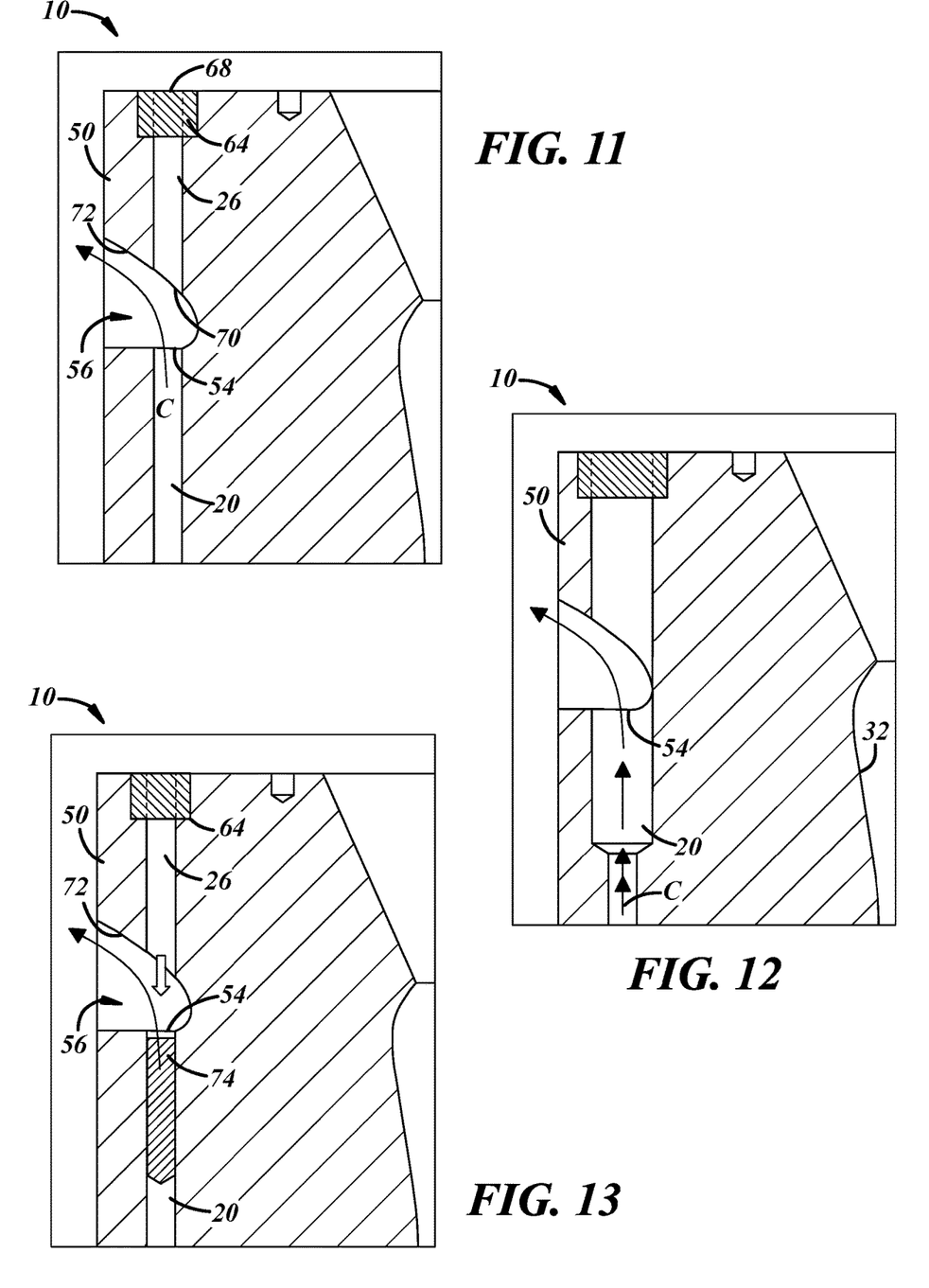
FIG. 11 is an enlarged view of another portion of the blank mold of FIG. 1.
FIG. 12 is the view of FIG. 11 after enlargement of an end of an axial cooling channel.
FIG. 13 is the view of FIG. 11 after disposing a channel insert in the axial cooling channel.

The above-described axial access openings 26 formed at least partially through the coolant deflector 50 of each mold section 36, 38 can also be used to alter the thermal characteristics of the mold 10. An enlarged view of a portion of the mold 10 of FIG. 1 is illustrated in FIG. 11. As noted above, each access opening 26 has one end 68 at the axial end surface 60 of the baffle end 12 of the mold and a second end 70 along the annular recess 56. The second end 70 of each opening 26 opens on a deflection surface 72 of the coolant deflector, which is a surface that redirects coolant C discharged from the outlet end 54 of each cooling channel 20 from an axial direction to a new direction having a radially outward component. The illustrated example includes a removable insert 64, which can help maintain functionality of the deflection surface and/or prevent debris from falling into the cooling channels 20.

Each access opening 26 provides access to the corresponding cooling channel 20 through the coolant deflector 50 to alter thermal characteristics of the mold 10. For example, the outlet end 54 of the cooling channel 20 can be enlarged as in FIG. 12 via the access opening 26. This method may include removing the removable insert 64 (if provided), aligning a rotary cutting tool with the access opening 26, and drilling to a depth beyond the outlet end 54 of the corresponding cooling channel 20. A new larger insert may optionally be provided to close off the enlarged access opening, as shown. Changing the cross-sectional size of a portion of the cooling channel 20 can alter thermal characteristics of the mold 10 by locally altering the flow rate of the coolant C in the channel 20. In this case, enlargement of a portion of the cooling channel 20 causes the coolant flow rate to be locally decreased, thereby reducing the cooling rate of a portion of the mold 10 and causing a portion of the mold surface 32 to run hotter than with the originally sized coolant channel.

In other embodiments, a channel insert 74 can be disposed in the axial cooling channel 20 by removing the removable insert 64 (if provided) and feeding the channel insert 74 through the access opening 26 and into the outlet end 54 of the cooling channel. In some cases, the access opening 26 is first enlarged to accommodate a channel insert 74 having a press-fit with the cooling channel 20 or to accommodate a tapping tool extending through the access opening 26 to tap the outlet end 54 of the cooling channel 20 for receiving a threaded channel insert 74. The channel insert can be solid, effectively blocking the cooling channel 20, or porous or perforated to reduce the mass flow rate of coolant along the entire length of the cooling channel.

As with formation of the above-described heat block channels 24, the presence of the access openings 26 permits alteration of thermal characteristics of the mold on-site at the same glass container manufacturing facility where the blank mold 10 is used in production. It is not possible with conventional blank molds to align a drill bit or other cutting tool with the outlet end of an axial cooling channel at least because the axial cooling channel is not visible through the coolant deflector. Moreover, the relatively small axial dimension of the annular recess 56 does not permit an axial cutting or insertion tool to access outlet ends of the axial cooling channels in a conventional blank mold.

An illustrative method may include the steps of forming a first glass container in a process using the above-described glass blank mold 10 and blow mold M, altering thermal characteristics of the blank mold, and forming a second glass container using the altered blank mold and the blow mold. The second glass container may have physical characteristics different from that of the first glass container with the only change being the altered thermal characteristics of the blank mold 10.

In one example, the first glass container has an undesirable first glass distribution. Thermal characteristics of the blank mold 10 are then altered by accessing the outlet end 54 of one of the cooling channels through an axial access opening 26 to modify coolant flow characteristics of the cooling channel 20. In various embodiments, the outlet end 54 of the axial cooling channel is enlarged as in FIG. 12 or a channel insert 74 is disposed in the cooling channel as in FIG. 13, either of which would reduce coolant flow through the cooling channel in a manner that causes a portion of the molding surface 32 to run hotter when forming a second parison than the same portion of the molding surface ran when forming the first parison. Consequently, the blow molding step in which the second glass container is formed may result in a different, more desirable second glass distribution. Other defects such as improper glass thickness, out-of-specification dimensions, optical defects from stretching the glass at an improper temperature in the blow molding step, or non-uniform glass distribution in the glass container can be addressed by altering coolant flow characteristics of the glass blank mold by accessing the cooling channels through the axial access openings.

In one embodiment, the method includes forming a first parison in a glass blank mold 10, forming a first glass container from the first parison in a glass blow mold, altering thermal characteristics of the glass blank mold by accessing the outlet end 54 of one of the cooling channels 20 through an axial access opening 26 to modify coolant flow characteristics of the cooling channel, subsequently forming a second parison in the glass blank mold, and forming a second glass container from the second parison in the glass blow mold. As noted above, the axial cooling channels 20 are arranged radially outboard of the molding surface. The axial access openings are formed through the coolant deflector of the glass blank mold, and each access opening is aligned with one of the cooling channels, opening on a deflection surface facing the outlet end of the aligned cooling channel.

Alteration of the thermal characteristics of the blank mold may include contacting the blank mold with a rotary cutting tool at one of the axial access openings 26 or at the outlet end 54 of the corresponding cooling channel 20 through the access opening and drilling to enlarge the outlet end of the cooling channel. In some embodiments, the alteration includes manually aligning the cutting tool with one of the access channels and drilling to enlarge the outlet end of the access opening and the cooling channel. In some embodiments, the alteration is performed using a non-programmable machine equipped with the rotary cutting tool.

To facilitate access to and provide an indicator of the location of the axial cooling channels from the deflector end of the glass blank mold at the glass container manufacturing facility, each access opening 26 may formed through the coolant deflector at the mold fabricating facility. Each access opening 26 may have the same diameter or cross-sectional area as the corresponding axial cooling channel 20. For example, each access opening 26 of the blank mold may be formed together with the corresponding axial cooling channel 20 by drilling or otherwise machining the cooling channel from the opposite end (i.e., the neck end 18 in the illustrated examples) of each mold portion all the way through to the deflector end (i.e., the baffle end in the illustrated examples). This ensures concentricity of the cooling channels 20 and access openings 26. Each cooling channel 20 and access opening 26 can also be formed together by drilling or otherwise machining each through the mold portion in the other direction.

An illustrative method may thus include receiving a first charge of molten glass into the glass blank mold, forming a first parison in a glass blank mold from the first charge of molten glass, forming a first glass container from the first parison in a glass blow mold, altering thermal characteristics of the glass blank mold to change how heat is transferred from glass to the glass blank mold, subsequently receiving a second charge of molten glass into the glass blank mold, forming a second parison in the glass blank mold from the second charge of molten glass, and forming a second glass container from the second parison in the glass blow mold. Altering the thermal characteristics of the glass blank mold may include forming a heat block channel at a pre-formed heat block channel locator and/or altering coolant flow characteristics of an axial cooling channel by accessing the cooling channel through the coolant deflector of the blank mold. All of these steps may be performed at the same glass container manufacturing facility using a non-programmable machine equipped with a rotary cutting tool to perform the alterations. The alterations of the glass blank mold may result in the second glass container having a different distribution of glass than the first glass container and/or elimination of a defect of the first glass container.

The resulting glass container blank mold 10 may have various combinations of heat block channel locators 22 and heat block channels 24 and/or axial cooling channels 20 with various individual coolant flow characteristics. The resulting glass blank container mold 10 may for example have at least one heat block channel 24 formed in at least one end 12, 18 of the mold, at least one heat block channel locator 22 where a heat block channel has not been formed, and at least one cooling channel 20 with a reduced coolant flow rate relative to another cooling channel. The circumferential arrays of the above-described features permit tailoring of the thermal characteristics of the blank mold at various angular locations about the mold cavity via more than one type of cooling system alteration, each of which can be made at the same glass container manufacturing facility where the blank mold is used in a glass container manufacturing process.

As used in herein, the terminology "for example," "e.g.," "for instance," "like," "such as," "comprising," "having," "including," and the like, when used with a listing of one or more elements, is to be construed as open-ended, meaning that the listing does not exclude additional elements. Also, as used herein, the term "may" is an expedient merely to indicate optionality, for instance, of a disclosed embodiment, element, feature, or the like, and should not be construed as rendering indefinite any disclosure herein. Moreover, directional words such as front, rear, top, bottom, upper, lower, radial, circumferential, axial, lateral, longitudinal, vertical, horizontal, transverse, and/or the like are employed by way of example and not necessarily limitation.

Finally, the subject matter of this application is presently disclosed in conjunction with several explicit illustrative embodiments and modifications to those embodiments, using various terms. All terms used herein are intended to be merely descriptive, rather than necessarily limiting, and are to be interpreted and construed in accordance with their ordinary and customary meaning in the art, unless used in a context that requires a different interpretation. And for the sake of expedience, each explicit illustrative embodiment and modification is hereby incorporated by reference into one or more of the other explicit illustrative embodiments and modifications. As such, many other embodiments, modifications, and equivalents thereto, either exist now or are yet to be discovered and, thus, it is neither intended nor possible to presently describe all such subject matter, which will readily be suggested to persons of ordinary skill in the art in view of the present disclosure. Rather, the present disclosure is intended to embrace all such embodiments and modifications of the subject matter of this application, and equivalents thereto, as fall within the broad scope of the accompanying claims.

The invention claimed is:

1. A glass container blank mold, comprising:
    a mold portion having a neck end, an opposite baffle end, and a molding surface located between said ends that partly defines the shape of an exterior surface of a glass parison formed in the mold;
    axial cooling channels formed within the mold portion and extending axially alongside and radially outboard of the molding surface; and
    heat block channel locators formed on both the neck and baffle ends of the mold portion, wherein each locator is visibly discernible from the end on which the locator is formed and located radially inboard of the cooling channels;
    wherein each locator has a thermally insignificant depth and is located such that, when a heat block channel having a thermally significant depth is formed at the locator, heat transfer characteristics of the mold portion are altered between the molding surface and at least one of the cooling channels,
    wherein the thermally insignificant depth is less than an axial distance from a surface in which the respective locator is formed to a parting line where a baffle or a neck ring meets the molding surface when the blank mold is in a closed condition, and
    wherein the thermally significant depth is greater than said axial distance.

2. The glass container blank mold of claim 1, wherein each locator is a marking and the thermally insignificant depth is zero.

3. The glass container blank mold of claim 1, wherein each locator is a blind pilot hole.

4. The glass container blank mold of claim 1, wherein each locator has a diameter and the thermally insignificant depth is less than or equal to the diameter.

5. The glass container blank mold of claim 1, wherein the cooling channels are arranged in a circumferential array and the locators are arranged in circumferential arrays on each end of the mold portion radially inboard of the array of cooling channels.

6. The glass container blank mold of claim 1, wherein the locators are arranged in a first circumferential array on the neck end and a second circumferential array on the baffle end, the first array being radially inboard of the second array.

7. The glass container blank mold of claim 1, further comprising at least one heat block channel formed in at least one of the ends of the mold portion, wherein each heat block channel: has a thermally significant depth, is located radially inboard of the cooling channels, and is in a circumferential array with the heat block channel locators.

8. The glass container blank mold of claim 1, further comprising:
    a coolant deflector at one of the ends of the mold portion, the coolant deflector having a deflection surface facing outlet ends of the cooling channels; and
    axial access openings formed through the coolant deflector, wherein each access opening is aligned with one of the cooling channels to provide access to the outlet end of the respective cooling channel through the deflector to alter coolant flow characteristics of the respective cooling channel.

9. The glass container blank mold of claim 1,
    wherein at least one of the axial cooling channels has a cross-sectional area at one end that is greater than a cross-sectional area at another location along the at least one of the cooling channels.

10. The glass container blank mold of claim 9, wherein the greater cross-sectional area is at an outlet end of the at least one of the cooling channels.

11. The glass container blank mold of claim 9, further comprising:
    a coolant deflector at the baffle end of the mold portion, the deflector having a deflection surface facing an outlet end of each of the at least one of the cooling channels; and
    an axial access opening formed through the deflector and aligned with one of the at least one of the cooling channels to provide access to the cooling channel through the deflector to alter coolant flow characteristics of the cooling channel.

12. A glass container blank mold, comprising:
    a mold portion having a neck end, an opposite baffle end, and a molding surface located between said ends that partly defines the shape of an exterior surface of a glass parison to be formed by the mold;
    an axial cooling channel formed within the mold portion and located between the ends of the mold portion radially outboard of the molding surface, the axial cooling channel having opposite inlet and outlet ends opening on an exterior surface of the mold portion;
    a coolant deflector at one of the ends of the mold portion, the coolant deflector having a deflection surface facing the outlet end of the cooling channel that deflects coolant exiting the mold portion at the outlet ends in a direction radially away from the mold portion; and
    an axial access opening formed through the deflector and aligned with the cooling channel to provide access to the outlet end of the cooling channel through the deflector to alter coolant flow characteristics of the cooling channel,
    wherein the axial access opening has a first end that opens on an axial end surface of the mold portion and an opposite second end that opens on the deflection surface of the coolant deflector.

13. The glass container blank mold of claim 12, wherein the coolant deflector is at the baffle end of the mold portion.

14. The glass container blank mold of claim 12, further comprising a removable plug in the first end of the access opening.

15. The glass container blank mold of claim 12, wherein the axial cooling channel is one of a plurality of axial cooling channels arranged in a first circumferential array, and the axial access opening is one of a plurality of axial access openings arranged in a second circumferential array in registration with the first circumferential array.

16. The glass container blank mold of claim 15, further comprising an array of heat block channel locators formed in the coolant deflector radially inboard of the first and second arrays, wherein each locator is: visibly discernible from the end of the mold at which the coolant deflector is located, has a thermally insignificant depth, and is located such that formation of a heat block channel to a thermally significant depth at one of the locators alters heat transfer characteristics of the mold portion between the molding surface and at least one of the cooling channels,
   wherein the thermally insignificant depth is less than an axial distance from a surface in which the respective locator is formed to a parting line where a baffle or a neck ring meets the molding surface when the blank mold is in a closed condition, and
   wherein the thermally significant depth is greater than said axial distance.

17. The glass container blank mold of claim 12, wherein the axial access opening has a diameter equal to a diameter of the axial cooling channel.

18. The glass container blank mold of claim 12, wherein the axial access opening is one of a plurality of axial access openings formed through the deflector and aligned with a corresponding plurality of axial cooling channels, at least one of the cooling channels having a cross-sectional area at the outlet end that is greater than a cross-sectional area at another location along the cooling channel.

19. The glass container blank mold of claim 12, further comprising an annular recess located along the exterior surface of the mold portion and delimiting the coolant deflector from a remainder of the mold portion, the deflection surface being defined along the annular recess, wherein the outlet end of the axial cooling channel opens along the annular recess and the second end of the axial access opening opens along the annular recess.

20. A method, comprising:
   (a) forming a first parison in a glass blank mold according to claim 1;
   (b) forming a first glass container from the first parison in a glass blow mold;
   (c) altering thermal characteristics of the glass blank mold by forming a heat block channel at one of the heat block channel locators to interfere with heat transfer through the blank mold;
   (d) forming a second parison in the glass blank mold after step (c); and
   (e) forming a second glass container from the second parison in the glass blow mold.

21. The method of claim 20, wherein step (c) includes contacting the blank mold with a rotary cutting tool at said one of the heat block channel locators and drilling to a thermally significant depth to form the heat block channel.

22. The method of claim 20, wherein step (c) includes manually aligning a rotary cutting tool with said one of the heat block channel locators and drilling to a thermally significant depth to form the heat block channel.

23. The method of claim 20, wherein steps (a) through (e) are each performed in the same glass container manufacturing facility using a non-programmable machine equipped with a rotary cutting tool to perform step (c).

24. The method of claim 20, further comprising:
   determining a distribution of glass of the first glass container after step (b);
   performing step (c) based on the determined distribution of glass of the first glass container.

25. A method, comprising:
   (a) receiving a first charge of molten glass into a glass blank mold according to claim 1;
   (b) forming a first parison in the glass blank mold from the first charge of molten glass;
   (c) forming a first glass container from the first parison in a glass blow mold;
   (d) altering thermal characteristics of the glass blank mold to change how heat is transferred from glass in the glass blank mold to the glass blank mold;
   (e) receiving a second charge of molten glass into the glass blank mold after step (d);
   (f) forming a second parison in the glass blank mold from the second charge of molten glass; and
   (g) forming a second glass container from the second parison in the glass blow mold, wherein the second glass container has a different distribution of glass than the first glass container;
   wherein step (d) includes: forming a heat block channel at one of the heat block channel locators, or altering coolant flow characteristics of one of the axial cooling channels by accessing said one of the cooling channels through a coolant deflector of the glass blank mold.

26. The method of claim 25, wherein steps (a) through (g) are each of performed at the same glass container manufacturing facility using a non-programmable machine equipped with a rotary cutting tool to perform step (d).

27. The method of claim 25, wherein the axial cooling channels are an array of axial cooling channels formed through the mold outboard of the molding surface, and the heat block channel locators include an array of heat block channel locators formed on each end of the mold portion,
   wherein step (d) includes drilling into at least one end of the mold to a thermally significant depth to form the heat block channel.

28. The method of claim 25, wherein the axial cooling channels are an array of axial cooling channels formed through the mold outboard of the molding surface and the mold further comprises an array of axial access openings formed through the coolant deflector at an end of the mold, each access opening being aligned with one of the cooling channels and having the same cross-sectional area as the corresponding cooling channel, and
   wherein step (d) includes accessing an outlet end of one of the cooling channels with a rotary cutting tool by extending the rotary cutting tool through a corresponding one of the access openings, and enlarging the outlet end of said one of the cooling channels with the rotary cutting tool.

29. A method, comprising:
   (a) forming a first parison in a glass blank mold according to claim 12;
   (b) forming a first glass container from the first parison in a glass blow mold;
   (c) altering thermal characteristics of the glass blank mold by accessing the outlet end of the cooling channel through the access opening to modify coolant flow characteristics of the cooling channel;
   (d) forming a second parison in the glass blank mold after step (c); and
   (e) forming a second glass container from the second parison in the glass blow mold.

30. The method of claim 29, wherein step (c) includes contacting the blank mold with a rotary cutting tool at the axial access opening and drilling to enlarge a cross-sectional area of the outlet end of the accessed cooling channel.

31. The method of claim 29, wherein step (c) includes manually aligning a rotary cutting tool with the access opening and moving the cutting tool into the outlet end of the cooling channel.

32. The method of claim 29, wherein step (c) includes disposing an insert in the cooling channel through the access opening.

33. The method of claim 29, wherein steps (a) through (e) are each performed in the same glass container manufacturing facility using a non-programmable machine equipped with a rotary cutting tool to perform step (c).

34. The method of claim 29, further comprising:
determining a distribution of glass of the first glass container after step (b);
performing step (c) based on the determined distribution of glass of the first glass container.

* * * * *